April 29, 1952 — J. E. POE — 2,594,798

BEAN DUSTER NOZZLE

Filed Jan. 4, 1949

Joseph E. Poe
INVENTOR.

Patented Apr. 29, 1952

2,594,798

UNITED STATES PATENT OFFICE 2,594,798

BEAN DUSTER NOZZLE

Joseph E. Poe, Clifton, N. C.

Application January 4, 1949, Serial No. 69,148

2 Claims. (Cl. 43—148)

This invention relates to a novel nozzle which is especially, but not necessarily, adapted to be used to advantage in connection with a hose, conduit or equivalent line to assist one in effectively spraying and distributing dust on plant life especially on growing beans.

More specifically stated, it is an object of the invention to subject the issuing stream of air and dust to the action of baffle means which latter not only serves to cause better intermingling and mixing of the dust and air to obtain an effective plant spray but actually diverts and separates the outcoming stream so that it is divided and ejected in substantially diametrically opposite horizontal planes whereby it may be effectively applied to the surfaces of plants more effectively and advantageously than heretofore possible with dusting nozzles currently known to me.

More particularly, novelty is predicated upon the adoption and use of the substantially U-shaped member whose limbs are connected with the pressured dust supply line and whose bight portion provides not only a baffle but, in addition, defines diametrically opposed ports for spreading and diverting the main stream by virtually "splitting" same into opposed auxiliary streams.

A further object of the invention is to provide a simple, economical and practical distributing head or nozzle construction of the aforementioned type which, in addition, has divergent and outwardly projecting shields which tend to divert the pressured dust away from the eyes and body of the walking or other attendant.

Other objects and advantages will become more readily apparent from the following description and the accompanying illustrative drawings.

In the drawings, wherein like numerals are employed to designate like parts throughout the views.

Figure 1:
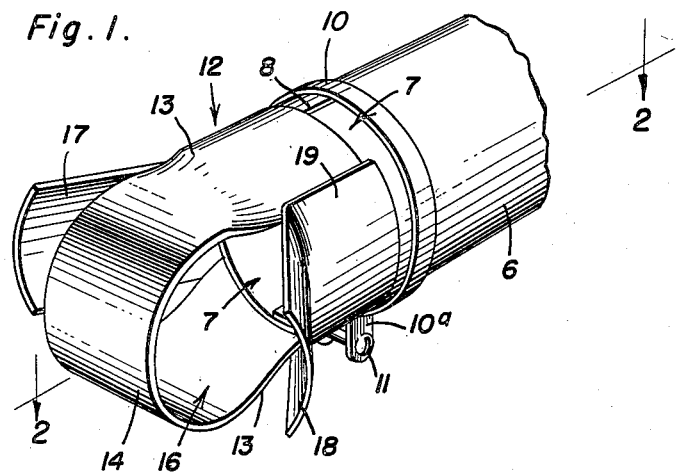
Figure 1 is a fragmentary perspective view showing a nozzle head constructed in accordance with the principles of my invention.

Referring now to the drawings by distinguishing reference numerals and accompanying lead lines, the delivery conduit hose or equivalent line is denoted by the numeral 6 and is connected with a suitable source where air under pressure carries a spray dust for plant dusting purposes. This hose 6 may well be the discharge line from a portable bellows-type power dusting device or from a wheel supported cart-type or other machine. In fact, it could be a line on a horse drawn or other powered machine of a larger type. It will be evident therefore that I am not interested in the part 6 except that it is the conduit to which my improved nozzle head is connected. My nozzle head comprises a radially expansible and contractable metal or equivalent sleeve 7 whose overlapping ends or edges 8 and 9 are joined and fastened around the conduit 6 by way of a clamping band 10. The clamp is provided with customary ears or lugs 10a and a connecting bolt 11. An essential part of the distributive head is a substantially flat metal strap or, let us say, a strap which is bent into U-shaped form and which is denoted, in a unitary way, by the numeral 12. This has its limb portions 13 arcuately bent and conforming to and soldered or otherwise secured to the assembling sleeve 7.

Figure 2:
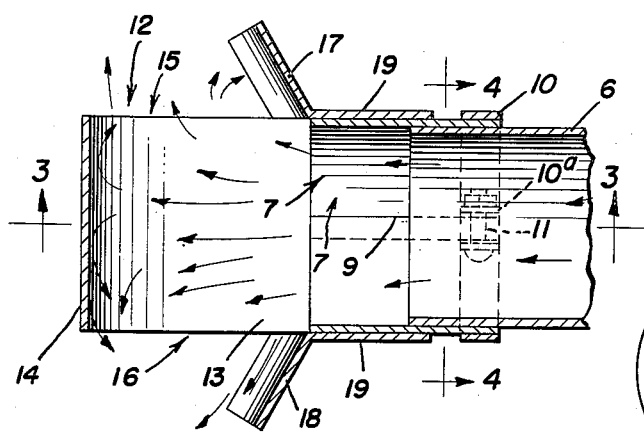
Figure 2 is a horizontal section taken centrally on the line 2—2 of Figure 1, looking in the direction of the arrows.
Figure 4:
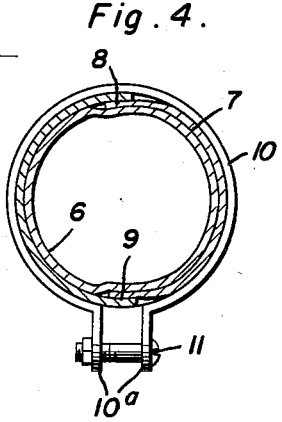
Figure 4 is a cross section on the line 4—4 of Figure 2, looking in the direction of the arrows.
Figure 3:
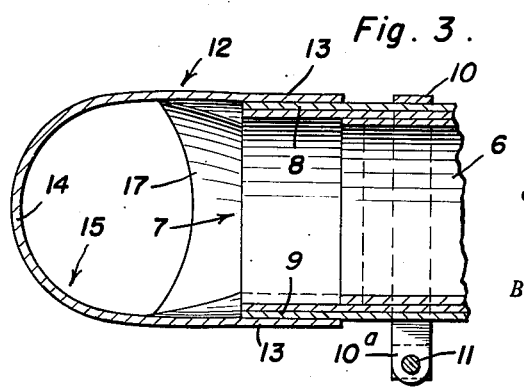
Figure 3 is a central vertical section on the line 3—3 of Figure 2.

The aforementioned baffle, which is defined by the bight portion is denoted by the numeral 14. In addition to providing a baffle it also produces and defines diametrically opposite discharge openings 15 and 16. With this arrangement, and as indicated by the directional arrows in Figure 2, the outcoming stream of dust laden pressured air takes the general course of action indicated by the arrows. That is to say, the head of the stream comes into abrupt contact with the baffle forming bight 14 where it is subjected to considerable disturbance and is then shunted sidewise in diametrically opposite directions and is thus ejected into lateral branches by way of the outlets 15 and 16. The numerals 17 and 18 designate forwardly diverging guards or shields which have shank portions 19 suitably secured either to the sleeve or the limbs 13. They are shown here welded to the limbs 13. I find that these blinker-like wings provide not only eye guards or shields but function as auxiliary deflector baffles. The result is that it is possible, by properly maneuvering the hose and nozzle, to direct the two streams, going in diametrically opposite directions, to best advantage on the surfaces of the beans or other plants being dusted. It is, of course a matter of common knowledge that in all instrumentalities falling in the category herein under advisement different persons employ same in diverse ways. Some might be inclined to cant the openings 15 and 16 to the horizontal plane and others might be inclined to turn the nozzle around axially from the position shown in the drawings and feed it into the branches of the plants and shoot the streams vertically. Nevertheless the general idea is that the pressured air propelled dust waves come through the conduit, strike the bight portion or baffle and split into opposite streams and are partly thrown forwardly by the diverter shields 17 and 18. It thus becomes possible to "play" the insecticidal dust streams in the manner desired.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A duster nozzle of the class shown and described comprising a cylindrical sleeve adapted to be telescopically fitted over the discharge end of a pressured dust delivery and discharging conduit, a relatively wide U-shaped sheet material strap having limb portions and an adjoining bight portion, said bight portion being concavo-convex and constituting a baffle, the ends of the limb portions being attached at diametrically opposite points to said sleeve and co-acting with the discharge end of the latter in defining a pair of discharge openings opposed to and in alignment with each other and both at right angles to the longitudinal axis of said sleeve, means for clamping said sleeve on said conduit, and a pair of deflectors secured to said sleeve and projecting beyond said discharge end and disposed outwardly of and in alignment with said discharge openings, said deflectors having their outer ends free and slanting away from said discharge openings in divergent relation in respect to each other and constituting eye protector shields.

2. A dust distributing and spraying head construction of the class shown and described comprising a relatively wide sheet material strap defining a U-shaped unit embodying a curved bight portion defining a baffle and further embodying a pair of limbs, the end portions of said limbs being free and arcuately shaped, an open ended cylindrical sleeve having one end portion fitted and secured between the arcuately shaped free end portions, the discharge end of said sleeve being spaced from said baffle, a pair of duplicate deflectors including forwardly and outwardly diverging shields and shank portions, the respective shank portions being attached to the aforementioned limbs and sleeve, said shields being disposed outwardly of the respective co-acting longitudinal edge portions of the limbs and said baffle and being at approximate right angles to said limbs.

JOSEPH E. POE.

REFERENCES CITED

The following references are of record in the file of this patent:

UNITED STATES PATENTS

| Number | Name | Date |
|---|---|---|
| 885,029 | Esty | Apr. 21, 1908 |
| 1,427,822 | Kennedy et al. | Sept. 5, 1922 |
| 1,836,505 | Pritchard | Dec. 15, 1931 |
| 2,282,828 | Root | May 12, 1942 |
| 2,295,088 | Kleucker | Sept. 8, 1942 |

FOREIGN PATENTS

| Number | Country | Date |
|---|---|---|
| 555,736 | Germany | July 27, 1932 |